United States Patent [19]

Arakawa et al.

[11] Patent Number: 5,038,294

[45] Date of Patent: Aug. 6, 1991

[54] AUTOMATIC GENERATING SYSTEM OF CONNECTION CONFIGURATION DIAGRAM AMONG UNITS

[75] Inventors: Hiroshi Arakawa, Odawara; Masao Shimada; Isao Nakada, both of Hadano, all of Japan

[73] Assignee: Hitachi, Ltd., Tokyo, Japan

[21] Appl. No.: 271,680

[22] Filed: Nov. 16, 1988

[30] Foreign Application Priority Data

Nov. 17, 1987 [JP] Japan .................. 62-290317

[51] Int. Cl.[5] ............................................. G06F 15/60
[52] U.S. Cl. ................................... 364/491; 364/490; 364/489; 364/513
[58] Field of Search ............... 364/488, 489, 490, 491, 364/513

[56] References Cited

U.S. PATENT DOCUMENTS

| | | | |
|---|---|---|---|
| 4,615,011 | 9/1986 | Linsker | 364/491 |
| 4,635,208 | 1/1987 | Coleby et al. | 364/491 |
| 4,638,442 | 1/1987 | Bryant et al. | 364/489 |
| 4,651,284 | 3/1987 | Watanabe et al. | 364/491 |
| 4,700,317 | 10/1987 | Watanabe et al. | 364/488 |
| 4,813,013 | 3/1989 | Dunn | 364/488 |
| 4,918,614 | 4/1990 | Modarres et al. | 364/489 |

OTHER PUBLICATIONS

"Artificial Intelligence Helps Cut ASIC Design Time" by Jin Kim, Electronic Design, Jun. 11, 1987, pp. 107-110.

"A Knowledge-Based System for Designing Testable VLSI Chips" by M. S. Abadir et al., IEEE Design & Test, Aug. 1985, pp. 56-67.

Primary Examiner—Parshotam S. Lall
Assistant Examiner—V. N. Trans
Attorney, Agent, or Firm—Antonelli, Terry, Stout & Kraus

[57] ABSTRACT

Generating apparatus and method by which all steps of the procedure for generating a configuration diagram of connection between a plurality of units constituting a system can be automated. The automatic connection configuration diagram generating system comprises a first memory for storing data indicative of the units by which the system is constituted, a second memory for storing data indicative of a layout according to which the units of the system are laid, a knowledge base for incorporating a set of rules indicative of connection specifications for all of the units of the system, a selector for selecting connection specification rules for desired units from the rule set stored in the knowledge base, a controller for determining a connection structure on the basis of the selected rules and the data stored in the first and second memories, and a third memory for storing the connection structure determined by the controller.

3 Claims, 8 Drawing Sheets

| TYPE NAME | SEQUENTIAL NUMBER | MACHINE NUMBER | DEVICE ADDRESS | ANNEX DATA |
|---|---|---|---|---|
| A-01 | 001 | A | | |
| P-1 | 001 | A | 0018 | 860813 |
| Q-12 | 001 | A | 000E | |
| R-12 | 001 | A | 0140 | |

FIG. 3

| TYPE NAME | SEQUENTIAL NUMBER | X | Y | Z |
|---|---|---|---|---|
| A-01 | 001 | 120 | 200 | 0 |
| P-1 | 001 | 120 | 460 | 0 |
| Q-12 | 001 | 540 | 210 | 90 |
| R-12 | 001 | 560 | 580 | 90 |

AUTOMATIC GENERATING SYSTEM OF CONNECTION CONFIGURATION DIAGRAM AMONG UNITS

BACKGROUND OF THE INVENTION

This invention relates to a system for automatically generating a configuration diagram of a connection between a plurality of units constituting a system and more particularly to an automatic connection configuration diagram generating system of the type adapted to automatically determine the specification of interconnection between individual units on the basis of structural information for the respective units, layout information and connection information. This invention therefore pertains to an automatic drawing or construction system which receives a system configuration diagram and a layout diagram to automatically deliver a system assembly drawing.

As the system comprised of a plurality of units, there is available, for example, a computer system which is installed in a limited space. Such a computer system comprises a central processing unit (CPU), a channel unit, an input/output control unit, an input/output unit and an external memory unit. In order to determine the desired or required connection between the individual units upon installation of the computer system, a conversational processing system using a computer has typically been utilized. The conversational processing system however forces the operator to preliminarily store various constraints on the interrelation between the respective units in this system. Further, in actual connection work, the operator of the system has to identify connection origination units, connection destination units and the kind of connecting wire.

U.S. Pat. No. 4,700,317 issued to Watana et al on Oct. 13, 1987 proposes an "Automatic Layout Planner and Method for Automatically Creating a Layout Plan". In the automatic unit layout planning system disclosed in the above literature, countermeasures for dealing with a variety of conditions which occur midway in the planning of a layout plan are stored as a rule consisting of a conditional part and an action part and portions of the rule matching occurring situations are accessed and utilized for determining the unit layout. This prior art system can determine the unit layout automatically but does not provide any information as to how interconnection between the individual units can be executed.

Conventionally, many systems for automatically designing wiring on a printed-circuit board and the like have been developed. This type of system, which is adapted to automatically design physical wiring paths and for automatic wiring design, presupposes that a diagram expressing a connection structure for circuit parts, such as a circuit diagram, has already been prepared and operates on the basis of data of the circuit diagram to perform an automatic wiring design. Because of the above inconvenience, the known automatic wiring design system for printed-circuit boards can not be applied to a processing for planning a data structure which expresses conditions for connection between individual units.

In the past, the configuration diagram of the connection between a plurality of units constituting a system has typically been planned in accordance with the following procedure, most of which is carried out manually:

(1) The connection relation between the units is determined on the basis of a system configuration diagram.
(2) The routing length of a cable(s) between units to be connected together is determined on the basis of a geometrical distance between the units which is indicated in a system layout drawing.
(3) Specifications of connectors of the units are decided from design materials, and the kind and standard size of the cable adapted for the connectors are determined.
(4) A connection diagram is drawn on the basis of the thus determined connection information.

The above procedure can not be performed manually without requiring skilled designers to spend considerable time and labor.

SUMMARY OF THE INVENTION

An object of this invention is to provide a system capable of automating all steps of the above procedure for system unit connection configuration diagram generating.

According to the invention, the above object can be accomplished by an automatic connection configuration diagram generation system comprising a first memory for storing data indicative of units by which a system is constituted, a second memory for storing data indicative of a layout according to which the units of the system are to be laid out, a knowledge base for incorporating a set of rules indicative of connection specifications for all of the units of the system, a selector for selecting connection specification rules for desired units from the rule set stored in the knowledge base, a controller for determining a connection structure on the basis of the selected rules and the data stored in the first and second memories, and a third memory for storing the connection structure determined by the controller.

With the above automatic generating system, a connection configuration diagram can be generated automatically as follows. Firstly, data expressing the structural information for units constituting a desired system is read out of the first memory and information indicating connection destination units is determined. Subsequently, data expressing the positional information for the units constituting the desired system is read out of the second memory and information about the positions of the units is determined. Subsequently, rules for generation of a data structure expressing the connection condition for the units are selected from the knowledge base and the connection specification for the units to be connected together is determined. The controller determines information about a connection structure for the units of the desired system on the basis of the unit position information, structure information and connection specification and stores the thus determined information in the third memory.

Thus, the kind and length of a cable for interconnecting the units are automatically determined. Consequently, data expressing the unit connection condition can be generated without requiring the operator to identify the connection destination unit and the kind and length of the cable.

DESCRIPTION OF THE PREFERRED EMBODIMENTS

The invention will now be described by way of example with reference to the accompanying drawings.

Figure 1:
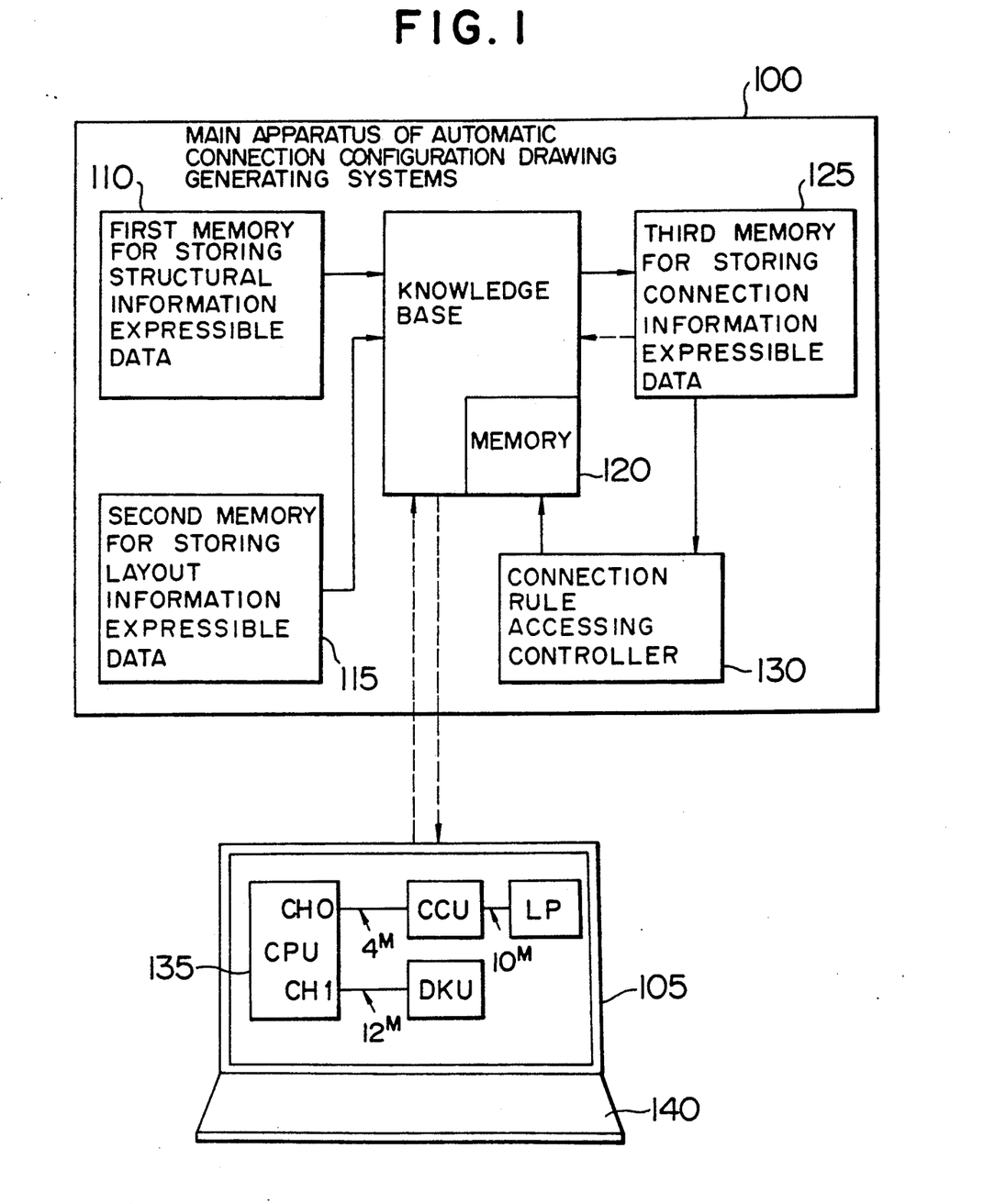
FIG. 1 is a block diagram illustrating an automatic connection configuration diagram generating system according to an embodiment of the invention.

Referring to FIG. 1, there is illustrated, in block diagram form, an automatic connection configuration diagram generating system according to an embodiment of the invention.

The automatic connection configuration diagram generating system of the invention comprises a system main apparatus 100 and a graphic display apparatus 105. The main apparatus 100 of the automatic connection configuration generating system includes first and second memories 110 and 115 for storing input parameters, a third memory 125 for storing output data, a knowledge base 120 for storing a set of connection rules and for generating connection structure expressible data by executing a rule selected on the basis of the input parameters, and a controller 130 for sequentially accessing the connection rules. The input parameters are provided as unit structural information expressible data stored in the first memory 110 and unit layout information expressible data stored in the second memory 115. The knowledge base 120 uses the connection rule set for generation of the unit connection structure expressible data on the basis of the structural information expressible data and layout information expressible data so as to execute the rule set. The generated connection structure expressible data is stored in the third memory 125. The connection rule accessing controller 130 accesses the connection rules stored in the knowledge base 120 on the basis of the contents of the third memory 125 for storage of the connection structure expressible data so as to cause the knowledge base 120 to execute the accessed connection rules.

The layout information expressible data is representative of a plan view illustrating a layout of requisite units within a limited space. The structural information expressible data is representative of a block diagram illustrating units to be connected together. The connection structure expressible data provides information necessary for actually interconnecting, on the spot, the units laid in the limited space and is representative of a diagram (table) showing designation of destinations to which individual units are to be connected as well as the length of cables, the kind of the cable and the kind of connectors.

The graphic display apparatus 105 includes a display 135 for displaying a connection condition read from the third memory 125 for storing the connection structure expressible data and edited by the knowledge base 120, and an input port 140 for instructing the knowledge base 120 to change the connection structure expressible data.

For example, connection conditions of interface cables between units constituting an electronic computer system and lengths of the interface cables are displayed on the screen of the display 135. The information displayed on the screen may be printed out as a hard copy.

A connection rule set is accessed from an internal memory of the knowledge base 120 on the basis of a system configuration diagram read out of the first memory 110 and a layout diagram read out of the second memory 115 and executed in the knowledge base 120. When a system assembly drawing is generated by the knowledge base 120, it is stored in the third memory 125. The controller 130 accesses and controls the system assembly drawing.

Specifically the system main apparatus 100 is formed of a computer system known in the art and the knowledge base 120 and connection rule controller 130 are processors having processing programs for automatic connection configuration diagram generating. The contents of the programs will be described in detail later.

Figure 2:
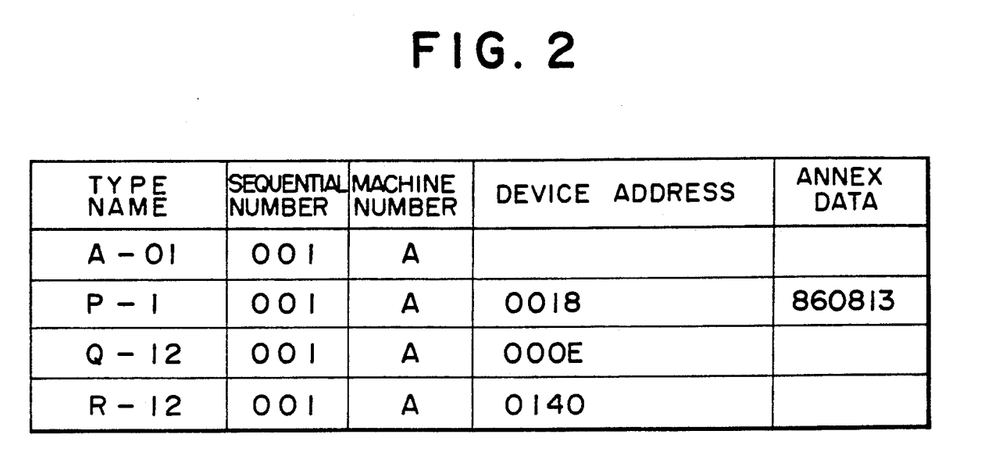
FIG. 2 shows a contents table of a structural information expressible data memory used in the FIG. 1 system.

Referring to FIG. 2, there is shown a contents table of the structural information expressible data stored in the first memory 110 shown in FIG. 1.

In this embodiment, the contents table is exemplified for the configuration condition of an electronic computer system. Described in items of the table is data containing the type name of units constituting the electronic computer system, the sequential number added to the type name for the purpose of definite identification of a plurality of units of the same type name, the machine number for identifying a central processing unit (CPU) to which the component unit is to be coupled, the device address used to decide which input/output channel number of the CPU the component unit is to be coupled to, and the annex data used to decide whether the component unit is an annexed unit or an existing unit.

Specifically, in the type name of unit, A-01 indicates the CPU, P-1 a communication control unit (CCU), Q-12 a line printer (LP) and R-12 a magnetic disc unit (DKU).

In FIG. 2, one unit is indicated by the type name and sequential number, and the CPU to which each unit is coupled and the input/output channel of this CPU can be determined by the machine number and device address. Specifically, it is indicated that the unit having the machine number A couples to the CPU identified by machine number A and having type name A-01 and sequential number 001, and that the unit having device address 0018 couples to input/output channel number 00 of the CPU. The device address is the number assigned to individual units and it consists of a channel number indicative of the CPU to which the unit is coupled and a unit number specific to the unit and which is set by hardware. The device address has 8 bits for the channel number and 8 bits for the unit number, amounting up to 16 bits in total and it is typically represented by 4 digits of hexadecimal number.

Figure 3:
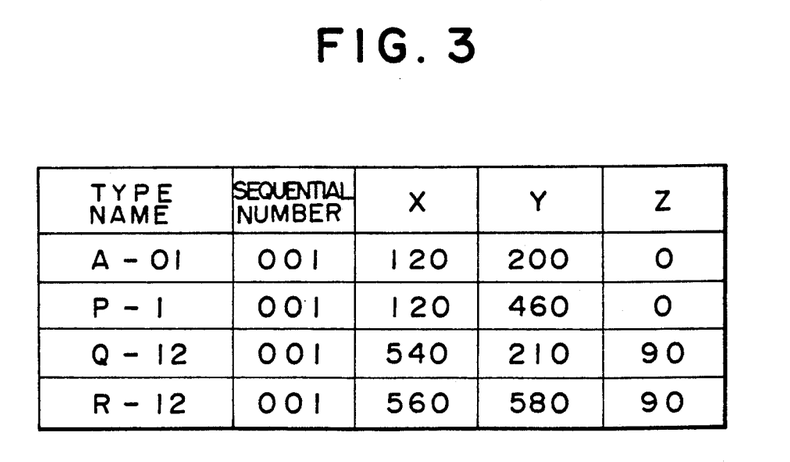
FIG. 3 shows a contents table of a layout information expressible data memory used in the FIG. 1 system.

Referring to FIG. 3, there is shown a contents table of the layout information expressible data stored in the second memory 115 shown in FIG. 1.

Figure 4:
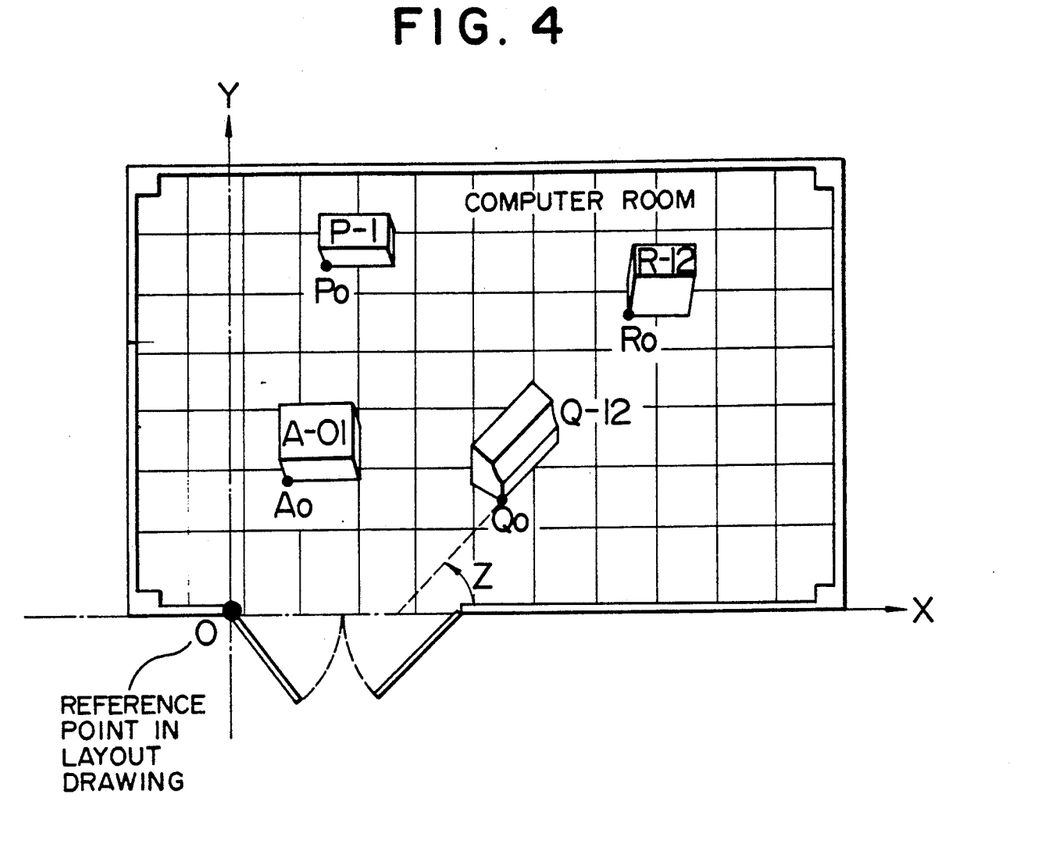
FIG. 4 is a diagram illustrating a layout of individual units in an electronic computer room.

Shown in FIG. 3 is layout information of units constituting the electronic computer system, the layout condition being described by the type name of the units, the sequential number added to the type name for the purpose of definite identification of a plurality of units of the same type name, and X, Y and Z used to indicate positions of the laid units in terms of lateral distance (X) and longitudinal distance (Y) from a reference point and angle (Z) relative to a reference line. A specific example of layout is illustrated in FIG. 4.

In this example, X represents the lateral distance between a predetermined reference point 0 in an electronic computer room and a predetermined reference point $A_0$, $P_0$, $Q_0$ or $R_0$ on each unit, Y represents the longitudinal distance between the reference point in the electronic computer room and the reference point on each unit, and Z represents the rotation angle made relative to the lateral direction when the front of each unit is rotated about the reference point on each unit.

In a specific example shown in FIG. 3, the same type name and sequential number as those of FIG. 2 are described to set up one-to-one correspondence between the type name and sequential number in FIG. 2 and those in FIG. 3.

The distance, $L_B$, between the reference point on the CPU having type name A-01 and sequential number 001 and the reference point on the CCU having type name P-1 and sequential number 001 is determined by $$L_B = \sqrt{(X_{CPU} - X_{CCU})^2 + (Y_{CPU} - Y_{CCU})^2}$$

where $X_{CPU}$ is distance X for the CPU, $X_{CCU}$ is distance X for the CCU, $Y_{CPU}$ is distance Y for the CPU and $Y_{CCU}$ is distance Y for the CCU.

Figure 5:
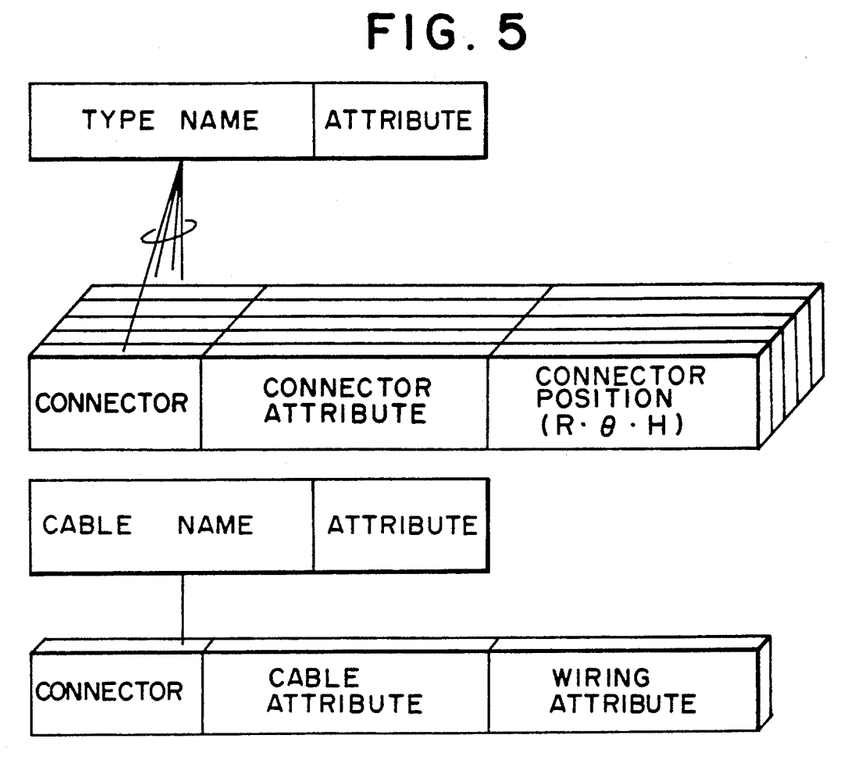
FIG. 5 is a diagram showing a set of rules stored in a knowledge base of the FIG. 1 system and used to generate a connection structure expressible data.

FIG. 5 shows an example of the basic data standing for the connection rule set stored in the memory of the knowledge base 120 shown in FIG. 1.

Preliminarily registered in the memory are the type name and attribute of individual units and information about connectors for cable connection, possessed by the individual units, including the connector attribute and connector position of each of the plural connectors. Also preliminarily registered in the memory are information about cables interconnecting connectors of the individual units including the cable name and attribute and information about connectors, possessed by the individual cables, including the cable attribute and wiring attribute of cable connector for each of the plural connectors.

The attribute of a unit consists of a code for sorting units having the associated type name and another code for implying that the units having the associated type name are carried on another unit.

The connector attribute of connectors possessed by the individual units is for determining connection conditions and graphic display conditions for the connector and it consists of a code representative of the kind of cables connectable to that connector, a code representative of the sort of that connector, a code representative of the physical shape of that connector, a code representative of the electrical specification of that connector, a code representative of the relation between that connector and another connector of the same unit (for example, concerning IN/OUT connectors, and connectors which are connectable in grouping fashion), a code representative of the drawing name of drawing format data used when graphically displaying that connector, and a code representative of the connector position on the drawing format. The aforementioned unit attribute and data in the drawing name and connector position in the connector attribute can be utilized to determine the sequence of displaying the connection structure expressible data on the display 105.

Figure 6:
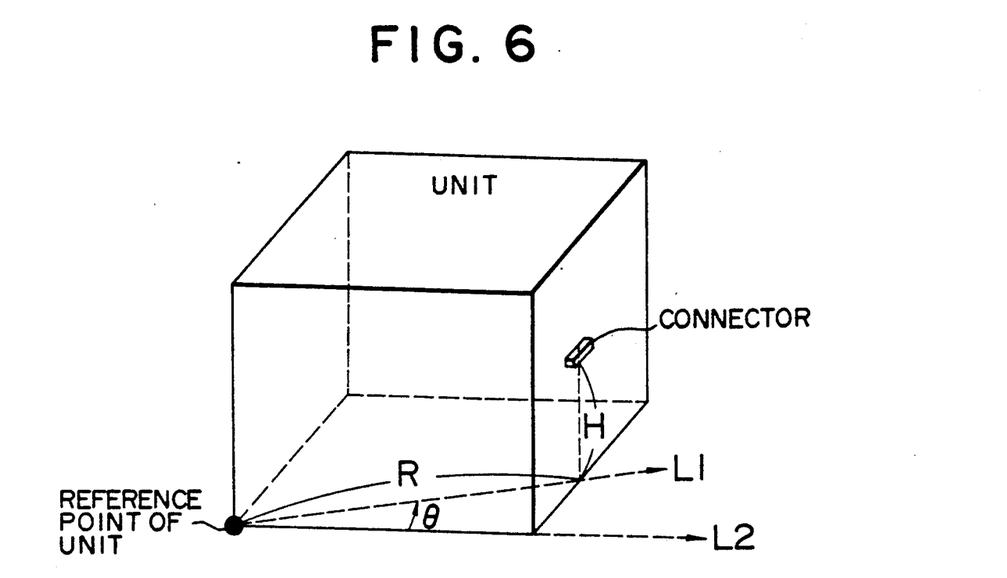
FIG. 6 is a diagram illustrating the position of a connector of a unit.

The connector position in each unit is defined by parameters R, $\theta$ and H as shown in FIG. 6. Of these parameters, R represents the horizontal distance between the position of the connector and a predetermined reference point on the unit explained with reference to FIG. 3, $\theta$ represents an angle between a straight line L 1 connecting the reference point on that unit and the position of that connector and a horizontal line L 2 passing through the reference point on that unit to extend in parallel with the front of that unit, and H represents the vertical length of a lead-in cable between the floor and the position of that connector on that unit.

By utilizing the information about the connector position, the length between the respective units can be determined. For example, the length, L, between a connector of the CPU having type name A-01 and sequential number 001 and a connector of the CCU having type name P-1 and sequential number shown in FIG. 3 is determined from the following equation:

$$L = H_{CPU} + H_{CCU} + \sqrt{(X_{CPUC} - X_{CCUC})^2 + (Y_{CPUC} - Y_{CCUC})^2}$$

where $X_{CPUC} = X_{CPU} + R_{CPU}\cos(Z_{CPU} + \theta_{CPU})$,
$X_{CCUC} = X_{CCU} + R_{CCU}\cos(Z_{CCU} + \theta_{CCU})$,
$Y_{CPUC} = Y_{CPU} + R_{CPU}\sin(Z_{CPU} + \theta_{CPU})$,
$Y_{CCUC} = Y_{CCU} + R_{CCU}\sin(Z_{CCU} + \theta_{CCU})$, $X_{CPU}$ is the distance X for the CPU, $X_{CCU}$ the distance X for the CCU, $Y_{CPU}$ the distance Y for the CPU, $Y_{CCU}$ the distance Y for the CCU, $R_{CPU}$ the distance R for the connector in question of the CPU, $R_{CCU}$ the distance R for the connector in question of the CCU, $Z_{CPU}$ the angle Z for the CPU, $Z_{CCU}$ the angle Z for the CCU, $\theta_{CPU}$ the angle $\theta$ for that connector of the CPU, and $\theta_{CCU}$ the angle $\theta$ for that connector of the CCU.

Like the unit data, information about cables interconnecting the units is registered in advance, including the cable name, the cable attribute and the wiring attribute of individual cable connectors.

The attribute of each cable consists of a code for sorting cables having the associated cable name and another code representative of the kind of cable standard sizes. Thus, the cable attribute is for determining the physical shape of the cable connector in question and the connection condition for that cable connector such as electrical specification of the associated connector.

By utilizing the cable attribute and results of calculation of the length between individual unit connectors, the cable standard size is selected and the cable length is determined.

The wiring attribute is for determining the wiring condition for cables such as the size of the associated cable connector and the diameter of the cable.

Figure 7:
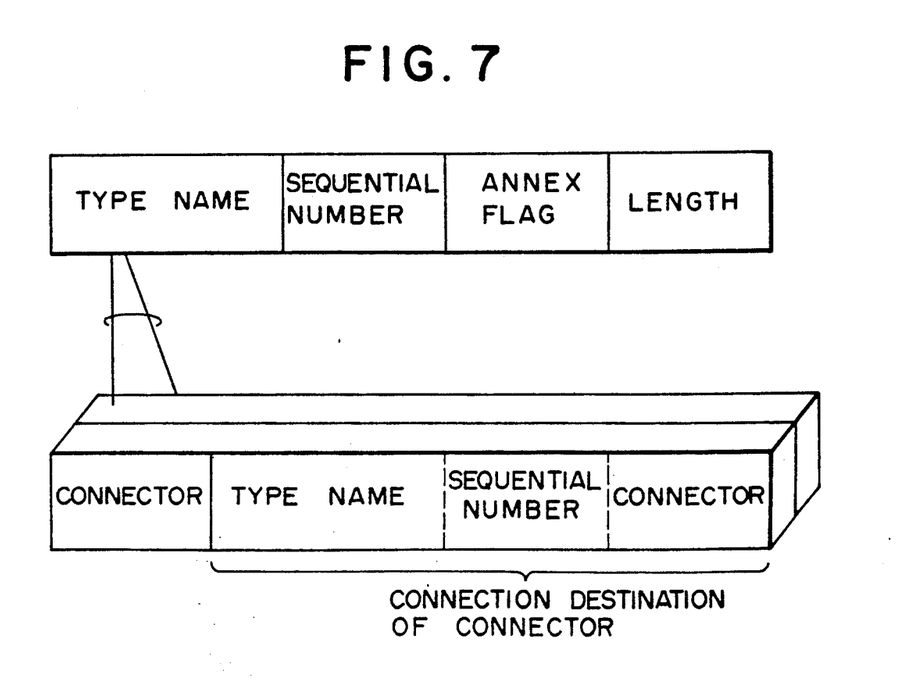
FIG. 7 is a diagram showing basic data representative of the contents of the connection structure expressible data memory of the FIG. 1 system.
Figure 8:
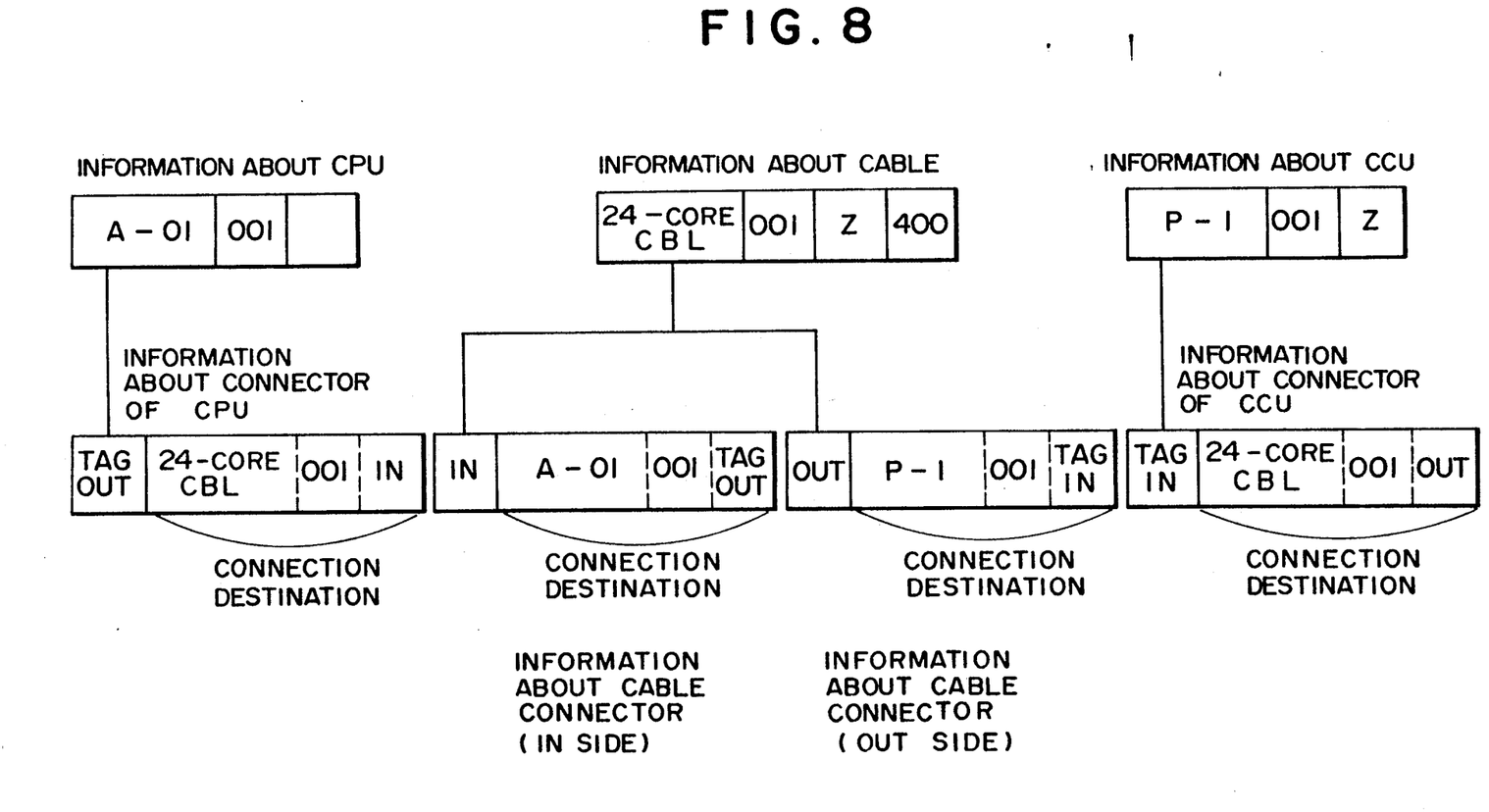
FIG. 8 is a diagram showing a specific example of the basic data shown in FIG. 7.

Referring to FIGS. 7 and 8, the contents of the connection structure expressible data memory 125 will now be described.

Particularly, FIG. 7 shows a basic data structure for cable connection structure. As shown, the memory has the area for information about the unit (or cable) including the type name of the unit or cable, the sequential number added to the type name for the purpose of definite identification of a plurality of units of the sam type name, the annex flag implying that the cable is a newly added cable, and the length of the cable. Further, the memory has, in association with the information area concerning the unit or cable, areas in which the type name of a destination unit or cable for which connection of the connector of the unit or cable is destined, the sequential number and the information about the connector are registered.

A specific example of the FIG. 7 memory contents is shown in FIG. 8 wherein the CPU of A-01 and the CCU of P-1 are connected together by a 24-core cable. More specifically, in this example, a connector TAGOUT of the CPU having type name A-01 and sequential number 001 is connected to a contact TAGIN of the CCU having type name P-1 and sequential number 001 by means of a 24-core cable having cable name CBL and sequential number 001. Thus, the information about the CPU indicates that connection of the connector TAGOUT of the A-01, 001 sequential number CPU is destined for the 24-core CBL, 001 sequential number annex cable of 4 meter length and that the CCU having type name P-1 and sequential number 001 is connected to the connector TAGOUT. The information about cable connector indicates that the 24-core cable of type name CBL and sequential number 001 has, on CPU side (IN), a connector having type name A-01 and sequential number 001 and on CCU side (OUT) a connector having type name P-1 and sequential number 001. The information about CCU connector indicates that the connection destination of the CCU having type name P-1 and sequential number 001 is the OUT side connector of the 24-core CBL, 001 sequential number cable.

The connection rule set stored in the knowledge base 120 includes, in addition to data shown in FIG. 5, a rule for determining the preferential sequence of connection of the individual units connectable to the input/output channel of the CPU and a rule for deciding whether the length of each connection cable exceeds a limited length or not.

Figure 9:
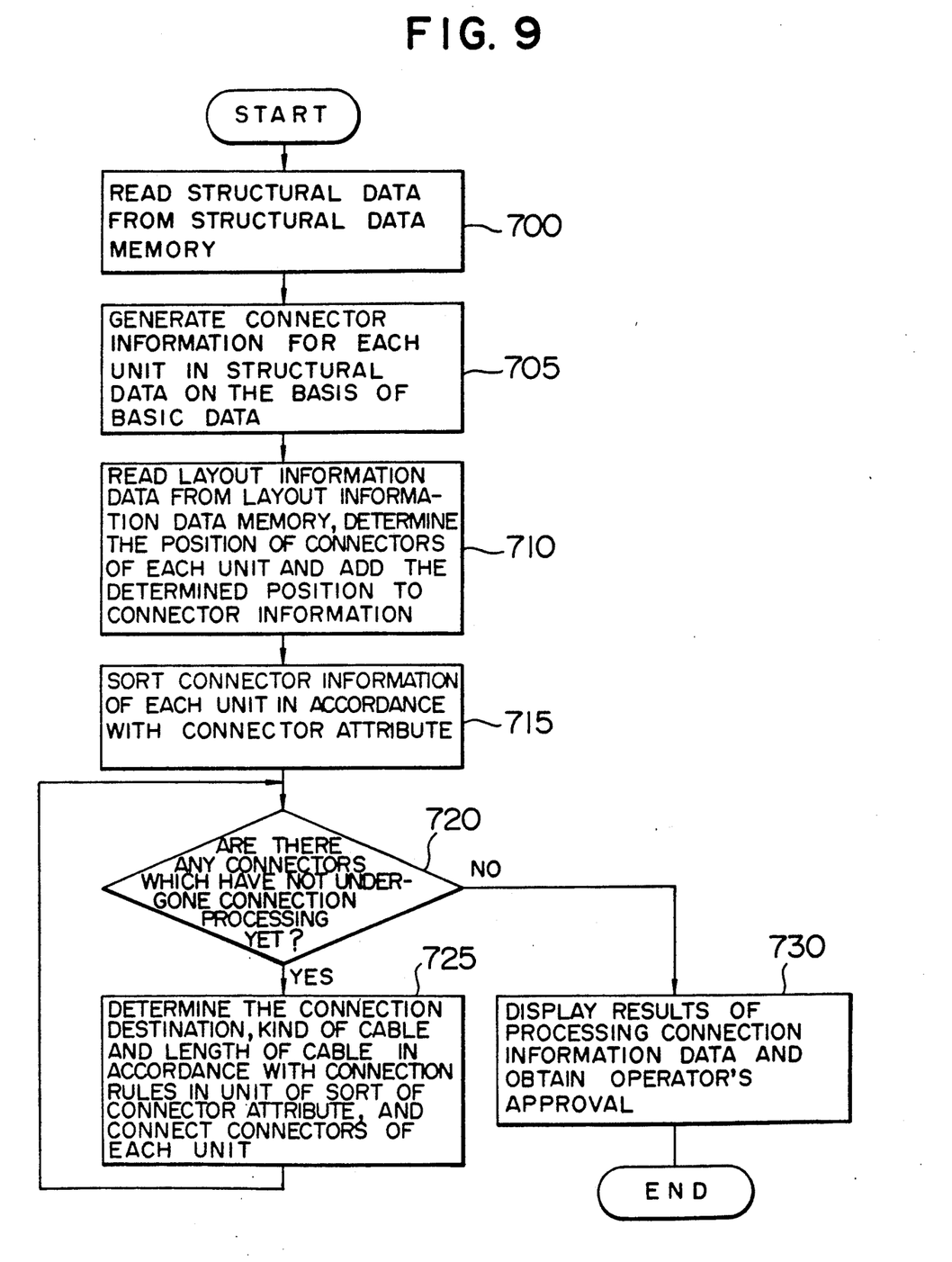
FIG. 9 is a flow chart showing an example of the operation of the automatic connection configuration generating system according to the invention.

Referring to FIG. 9 there is illustrated a flow chart of the operation of the automatic connection configuration generating system according to the invention.

Prior to activation, structural information expressible data which has been prepared preliminarily by means of another automatic generating system, is stored in memory 110 and layout information expressible data is stored in memory 115. For preparation of the structural information expressible data and layout information expressible data, any generating system known in the art may be utilized.

When the procedure in the FIG. 9 flow chart is started, the type name and sequential number of the units, the machine number, the device address and the annex data (FIG. 2) are read out of the structural information expressible data memory 110 and written into the knowledge base 120 (step 700). Subsequently, in the knowledge base 120, connector information is generated for each of the read-out units on the basis of basic data (rule set) as shown in FIG. 5 stored in the internal memory (step 705).

Subsequently, layout information data (FIG. 3) corresponding to the respective unit type name and sequential number is read out of the layout information expressible data memory 115, written into the knowledge base 120 and added to the connector information for each unit (step 710).

Till then, the structural information data, layout information data and connector information for each unit has been stored in the internal memory of the knowledge base 120. Of them, the type name, sequential number, annex flag and connector name for each unit are stored in the connection information expressible data memory 125 in the form of the data structure as shown in FIGS. 7 and 8 and connectors of the respective units are sorted in accordance with the connector attribute (step 715).

The connection rule accessing controller 130 decides whether there are any connectors which have not undergone connection processing yet (step 720). If the answer is "NO", the controller 130 reads results obtained from the connection information expressible data memory 125, and read-out data is edited by the knowledge base 120 and displayed on the display 135 to obtain an operator's approval (step 730).

Reviewing the connection results displayed on the display 135, the operator can instruct the knowledge base 120 to change its contents by manipulating the input port 140. If the operator's approval is obtained, the procedure will end.

On the other hand, if "YES" is issued from step 720 indicating that there are connectors which have not undergone connection processing yet, the connection destination, the kind of wire and the length of wire are determined in accordance with the connection rule in unit of sort of the connector attribute and connectors of interest are connected (step 725). Then, the connection rule accessing controller 130 returns to the step 720 to decide whether there are any connectors which have not been processed yet.

In the embodiment described previously, in order to automatically generate the interface cable connection condition between units constituting an electronic computer system, structural information expressible data (system configuration diagram) for the units and a unit layout information expressible data (layout diagram) are preliminarily stored in the first and second memories, and a rule set stored in the internal memory of the knowledge base and used to generate an interface cable connection condition between the units is selected in accordance with the unit structure and layout conditions to cause the connection rule executor in the knowledge base to automatically generate a connection structure (cable wiring diagram such as a system assembly drawing). With this construction, the labor time required for the operator to plan a work diagram of interface cable connection between the units constituting the electronic computer system can be reduced.

Although in the foregoing embodiment the structural information expressible data including the machine number and device address is used, other data implying interconnection between individual units may be used.

The layout information expressible data is applied in the foregoing embodiment to a layout in a limited space but it may be applied to an instance where part of the component units are remotely located. In this case, a plurality of pieces of layout information expressible data are used to perform smooth processing. Specifically, the reference point and reference line are possessed by each piece of layout information expressible data, a layout name of interest is registered in association with X, Y and Z in the temporary data and when determining the cable length by using the temporary data, the cable length is determined on the basis of X, Y and Z for the same layout name.

The structure of programs possessed by the processor of system main apparatus 100 will now be described in connection with the flow chart of FIG. 9.

Programs are enumerated in the following Table 1.

TABLE 1

List of Programs

| No. | Program | Function |
|---|---|---|
| 1 | Program for initial preparation of temporary data | Initiated by input key operation on the input port 140 to instruct which data in the first to third memories is to be used, to retrieve the basic data shown in FIG. 5 and to develop data necessary for connection processing on the temporary data. |
| 2 | Connection processing program | Prepares connection data for cables between units on the basis of the temporary data and updates the temporary data. |
| 3 | Output processing program | Stores processing results in the third memory, generates a layout diagram on the drawing format in accordance connection data for cables between units on the temporary data, and delivers the layout diagram to the display 105 or a printer (not shown). |

Figure 10:
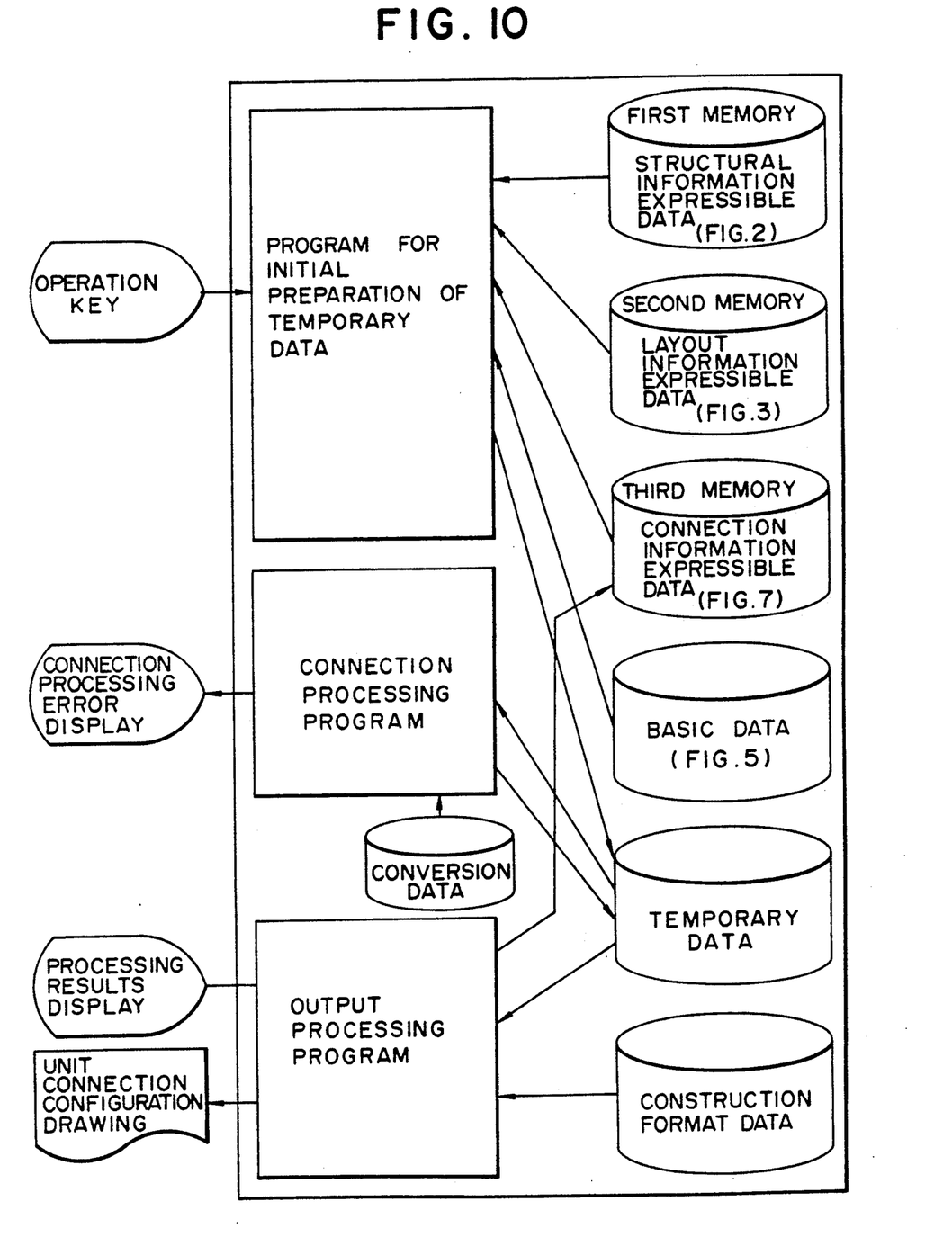
FIG. 10 is a diagrammatic representation showing a program schema used in the system of the invention.

FIG. 10 illustrates a program schema of the system of the invention.

Figure 11:
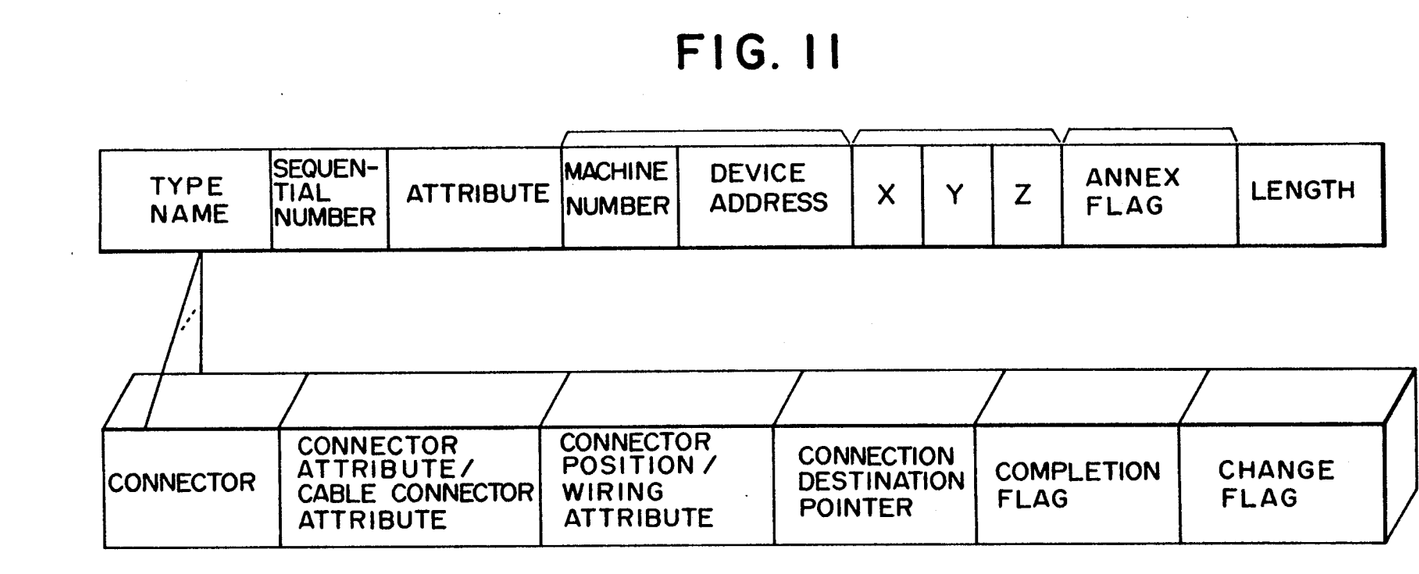
FIG. 11 shows a temporary data structure.

The temporary data is work data for generating the drawing of the connection structure among the units. In order to simplify the processing of the connection processing program and output processing program, the program for initial preparation of temporary data is used to generate the temporary data. The temporary data has, as shown in FIG. 11, information about the basic data which is added with unit layout position information (X, Y, Z) and connection data for designating the interrelation between unit connector and cable connector. The unit has the same data structure as the cable shown in FIG. 11. The type name, sequential number, attribute and connector information for the total connector possessed by the units and the cables are derived from data shown in FIG. 5 and for the units, the connector, connector attribute and connector position are further derived from the basic data of FIG. 5. For the cables, the connector, cable connector attribute and wiring attribute are further derived from the basic data of FIG. 5.

The machine number, device address and annex flag are derived from the structural information expressible data shown in FIG. 2, the parameters X, Y and Z are derived from the layout information expressible data shown in FIG. 3, and the connection destination pointer is procured if the present system assembly drawing is recorded in the third memory.

"Length" in the data structure shown in FIG. 11 is indicative of the length of cable and valid only when the type name is representative of the cable. Like the connection destination pointer, the length is procured if the drawing of the present connection structure in the units is stored in the third memory.

"Completion flag" is a flag added when connection processing for the connector of interest is completed and it is used in connection processing.

"Change flag" is a flag which indicates that the connection destination pointer for the connector of interest is updated and it is utilized to clarify a changed portion in drawing or construction processing.

The above procedure is included in steps 700, 705 and 710 in the flow chart of FIG. 9.

A specific processing pursuant to the connection processing program shown in FIG. 10 will now be described.

Figure 12:
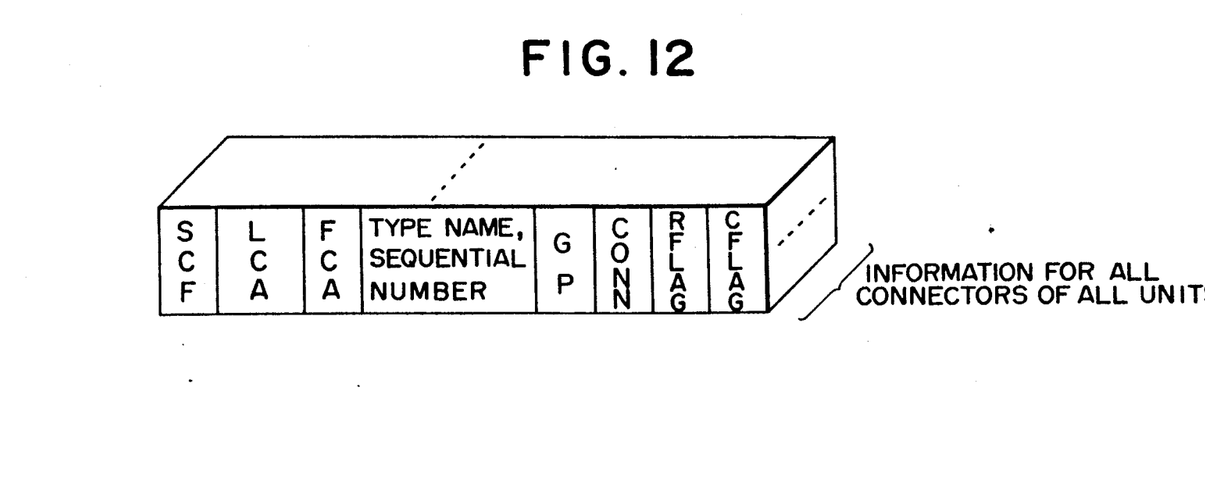
FIG. 12 shows a data structure of connector information.

Firstly, the following Table 2 is prepared in connection with each unit connector in the temporary data, the connector information is sorted on the bases of connectors having the same supplemental control code and the same logical interface code in the table, and the connection processing is carried out. This procedure corresponds to step 715 in FIG. 9. The sorted connector information has a data structure as illustrated in FIG. 12.

TABLE 2

| No. | Field Name | Byte Number | Contents |
|---|---|---|---|
| 1 | Supplemental control code (SCF) | 2 | Code for controlling unit of processing of connectors during cable connection. Corresponds to the machine number when processing is carried out in unit of machine number. |
| 2 | Logical interface code (LCD) | 6 | Sets the logical interface code of the basic data. Controls the sequence of connection processing. |
| 3 | Parent/child code (FCD) | 2 | Sets a parent/child code of the basic data. Indicates the parent/child relation in the logical interface code. |
| 4 | Type name, sequential number | 19 | Sets the type name and sequential number of the temporary data. |
| 5 | Group pointer (GP) | 2 | Sets the group pointer of the basic data. Used in grouping connection processing. |
| 6 | Connector key (CONN) | 5 | Sets a connector key of the temporary data. |
| 7 | Processing request flag (RFLAG) | 1 | Sets the annex flag of the temporary data. |
| 8 | Processing completion flag (CFLAG) | 1 | Sets a flag when the connection processing is completed. |

After completion of the processings in Table 2, the temporary data is updated until all the flags are set. For the unit, a withdrawal flag, the connection destination pointer, the completion flag and the change flag are set. For the cable, the key, length, annex flag, connector key, connection destination pointer and change flag of the temporary data are generated in connection with an annex cable, the withdrawal flag is set in connection with a withdrawal cable, and the connection pointer is changed and the change flag is set in connection with a connection change cable.

The set information can be determined as will be described below through the following processings (1) to (9).
(1) A connector key set having the same supplemental control code, logical interface code and type name and sequential number is determined.
(2) The thus determined connector key set is sorted into parent connector keys and child connector keys in accordance with the parent/child code.
(3) Child connector keys connectable to parent connector keys are determined using the machine number and device address information.

Algorithm for determining connectable parent and child connectors from the machine number and device address is as follows.

For example, assuming that connectors of only a unit of machine number A and units of machine number A in common use are connectable to a connector of the CPU of machine number A, this rule is previously registered (This rule data is called address mask.) in the connector attribute of the basic data shown in FIG. 5 to select the connectors of the unit of machine number A and units of machine number A in common use.

Example

It is assumed that the address mask is F for neglecting the machine number and O for deciding the machine number. If the address mask is O in connection with a unit having the machine number A with connector 1, 0 in connection with a unit having the machine number B with connector 2 and 0 in connection with a unit having the machine numbers A and B with common use connector 3, the connectors 1 and 2 can not be connected together because of different machine numbers, and the connectors 1 and 3 are connection candidates because the connector 3 belongs to machine number A.

The connection destination can be decided using the device address in the following manner.

A device address of a parent unit is determined.

Example

D-1 DKC:(014X)$_{16}$ (DKC:Disk Control)
(b) Address mask data contained in connector data for the parent unit is determined.

Example

D-1 DKC Connector BUS:(1111 1111 1110 0000)$_2$ (c) The device address is converted into a binary number which in turn is ANDed with the address mask to provide an address for checking.

Example

| | |
|---|---|
| (014X)$_{16}$ = | (0000 0001 0100 0000)$_2$ |
| | (1111 1111 1110 0000)$_2$ |
| logical product | (0000 0001 0100 0000)$_2$ = (0140)$_{16}$ |

(d) A similar processing is effected for a connector of a unit to be connected.

Example

R-12 DKU:(0150)$_{16}$
R-12 DKU Connector BUSIN:(1111 1111 1110 0000)$_2$ (0150)$_{16}$ = (0000 0001 0101 0000)$_2$

| | |
|---|---|
| | (1111 1111 1110 0000)$_2$ |
| logical product | (0000 0001 0100 0000)$_2$ = (0140)$_{16}$ |

(e) Results of the above processings (c) and (d) are compared and it is decided by coincidence that the connection is permitted and by non-coincidence that the connection is not permitted.

In other words, since bits to be set by the parent unit are contained in the device address for the unit to be connected, these bit positions are extracted by ANDing the device address and address mask and permissibility of connection is decided by comparing the logical product with the device address.

Example

R-12 DKU:(0150)$_{16}$ device address
This device address is broken down to (4) Connection form is determined from the connector attribute (It is called a processing attribute.) of the basic data shown in FIG. 5.

(5) If a series connection form is determined, the order of series connection of child units is determined from rule data present in the knowledge base.

The series connection order determination rule is as follows.

The connection priority order concerning to a child unit relative to the parent unit is determined.

A rule data for determining the connection priority order may use for example Table 3 as follows. Table 3 registers the connection priority order of each unit type name in each category where an auxiliary control code, a logical interface code and a parent/child code are equal with each other.

If there are units having same connection priority order, the connection order of the units is determined by positional relation between the units on the basis of the location information data such that the minimum distance route is provided between the units.

TABLE 3

| No. | Field name | Byte number | Contents |
|---|---|---|---|
| 1 | Supplemental control code (SCF) | 2 | Similar to the contents in the processing table |
| 2 | Logical interface code (LCD) | 6 | Similar to the contents in the processing table |
| 3 | Parent/child code (FCD) | 2 | Similar to the contents in the processing table |
| 4 | Type name 1 | 15 | Type name 1 having sorting of Nos. 1 to 3 |
| | Connection order 1 | 2 | Connection order for type name 1 |
| | Type name n | 15 | Type name n having sorting of Nos. 1 to 3. |
| | Connection order n | 2 | Connection order for type name n |

(6) Subsequently, the name of a cable to be connected is determined pursuant to connectable cable automatic selection algorithm on the basis of the connector attribute (the physical interface) of the basic data shown in FIG. 5 for the connection connectors.

For automatic selection of the type name of the cable connectable between the connectors is automatically determined in accordance with the following program:

(a) The cable type name in the conversion data base corresponding to a physical interface of a connector of interest to be processed is determined.

(b) For a connector and another connector to be connected with the former connector, cable type names are determined similarly.

(c) The cable type name determined in the above (a) is compared with the cable type name determined in (b) and coincidence provides a connectable cable type name.

In the absence of any connectable cable label name error display is indicated.

The conversion data base is one part of the connection rule group in the knowledge base.

(7) When connection connectors are determined through the above processings (3) to (6), the required cable length between the connection connectors is determined on the basis of the parameters X, Y, Z, R, θ and H.

When a plurality of cables are to be connected between particular units, a grouping connection can be effected in which the connection cable length is determined in unit of grouped connectors and cables having the thus determined connection cable length are between the particular units in a group fashion. The connection conditions for cables in the grouping connection can be displayed on the display in group fashion. It is called a grouping connection. The grouping connection means that a cable length is determined at each connector unit.

The grouping connection is permitted only when all of the following conditions are satisfied.

(a) Data representative of grouped connector name and grouped cable name should be contained in the conversion data base corresponding to connector data (group pointer etc.) for connectors of interest to be processed.

(b) Data representative of grouped connector name and grouped cable name should also be contained in the conversion data base corresponding to connector data for connectors of units to be connected.

(c) The length should be the same for the cables to be connected. This prevents cables of different drawing numbers having different lengths from being grouped inadvertently.

(d) Cables which have already been connected between units are permitted to be grouped, provided that the length is the same for these cables and that these cables are not connected to only part of connectors to be grouped.

Unless all of the above conditions are met, the grouping connection is not performed but cables are connected one by one.

(8) Subsequently, the length of the determined cable is set to the standard length.

Example

Given that the necessary cable length is 11 m and standard sizes indicated in the cable type are 8 m, 10 m, 12 m and 16 m, 12 m is then selected.

(9) The thus determined connection cable length is checked for its excess over a limited length pursuant to the unit specification. If excessive, the limited length is displayed as an error.

Through execution of the above processings (1) to (9), the step 725 in the FIG. 9 flow chart is completed.

As described above, according to the invention, since a unit connection structure drawing can be generated automatically by inputting structural information and layout information, it is possible to reduce the labor required for the operator to make a data structure which expresses connection structure in a system constituted by a plurality of units, such as an electronic computer system.

We claim:

1. An apparatus for automatically generating a configuration diagram of connection between a plurality of units constituting a system, comprising:

first memory means for storing data indicative of said units by which said system is constituted;

second memory means for storing a data structure indicative of a layout according to which said units of said system are to be laid out using cable;

a knowledge base for incorporating a set of rules indicative of connection specifications for all of said units of said system;

means for selecting connection specification rules for desired units from the rules set stored in said knowledge base;

control means for determining a connection structure on the basis of the selected rules and the data stored in said first and second memory means; and third memory means for storing the connection structure determined by said control means;

wherein said control means includes means for generating connector information from said selected connection specification rules and data read out of said first memory means, means for determining the position of connectors on the basis of data read out of said second memory means, means for sorting said connector information in accordance with connector attributes, and means for determining the connection destination of each unit and each cable, the kind of cable and the length of cable on the basis of said connection specification rules.

2. An apparatus for automatically generating a configuration diagram according to claim 1, wherein said system is an electronic computer system, said data stored in said first memory means includes the type name for identifying the individual units constituting said computer system, the machine number indicative of a central processing unit (CPU) to which the individual units are coupled, the device address of said CPU coupled with each unit and data indicating whether each unit is an annexed unit, said data stored in said second memory means includes the type name of each unit and data indicative of the geometrical position of each unit relative to a reference position, and said knowledge base stores a data including data concerning the type name and attribute of each unit, data concerning the attribute and position of connectors possessed by each unit, data concerning the type name and attribute of each cable for interconnection between the respective units and data concerning the cable attribute and wiring attribute of connectors possessed by each cable.

3. A method of automatically generating a configuration diagram of connection between a plurality of units constituting a system, comprising the steps of:

storing data indicative of said units by which said system is constituted in first memory means;

storing data indicative of a layout according to which said units of said system are to be laid out;

storing a set of rules indicative of connection specifications for all of said units of said system in a knowledge base;

reading said data concerning a system assembly from said first memory means;

generating connector information on the basis of said rule set and said data read out of said first memory means;

reading said data indicative of the layout of said units from said second memory means;

determining the position of connectors on the basis of said data read out of said second memory means and adding the determined connector position to said connector information;

sorting said connector information in accordance with a connector attribute; and determining the connection destination of each unit and each cable, the kind of cable and the length of cable according to said connector attribute on the basis of the connection rules stored in said knowledge base.

* * * * *